Aug. 24, 1965    E. S. HOWARTH ETAL    3,201,853
METHOD OF MAKING AN ELECTRICAL ALUMINUM-COPPER CONNECTION
Original Filed April 26, 1960

INVENTORS
Elbert S. Howarth &
BY Robert A. Ramser

ATTORNEY

United States Patent Office 3,201,853
Patented Aug. 24, 1965

3,201,853
METHOD OF MAKING AN ELECTRICAL ALUMINUM-COPPER CONNECTION
Elbert S. Howarth and Robert A. Ramser, New Kensington, Pa., assignors to Aluminum Company of America, Pittsburgh, Pa., a corporation of Pennsylvania
Continuation of application Ser. No. 24,801, Apr. 26, 1960. This application Sept. 24, 1963, Ser. No. 312,251
2 Claims. (Cl. 29—155.55)

This application is a continuation of our copending application, Serial No. 24,801, filed April 26, 1960, and now abandoned.

This invention relates to an improved joint between aluminum and copper, and to the method of producing such joints. More specifically, this invention relates to an improved electrical connector having a copper contact face and an aluminum backing member, and a method for making the connector.

In conventional welding methods, particularly those other than flash welding, the weld interface between aluminum and copper members is brittle and possesses limited mechanical strength. In addition, the connections show greater electrical resistance than either of the parent metals. These undesirable conditions may be somewhat minimized by flash welding the copper and aluminum members.

Flash-butt welding or flash welding is usually accomplished by arranging the two pieces to be welded end to end, connecting them to a suitable source of electricity, establishing and maintaining an arc between them which melts the metal in a localized area at the ends of the pieces, then pushing the pieces together to extinguish the arc and produce the welded joint, and subsequently cutting off the current. Flash welding machines used for this purpose generally comprise a fixed die and a movable die, both adapted to clamp the work pieces, mechanism adapted to drive the movable die to bring the work pieces together, a suitable source of electricity connected to said dies, such as the secondary of a transformer, and an automatic switch actuated by movement of the die for cutting off the current.

However, it is difficult to produce a satisfactory flash weld between aluminum and copper pieces of relatively large diameter. The reason is that as the diameter or cross-sectional area of the pieces to be joined increases, longer periods of flashing are required so that in bringing the pieces into contact with one another during arcing, excessive spattering and burning away of the metal occurs.

In the production of aluminum by the electrochemical reduction of alumina, aluminum bus bars for supplying electric current to the carbon anodes are supported above the electrolyte cavity of the reduction cell. Copper anode bars, clamped to the bus, support the carbon anodes and carry current to them. However, the natural oxide film formed on an aluminum surface exhibits high electrical resistance, and consequently a mechanical connection between aluminum and copper surfaces is electrically inefficient. This is particularly true under the operating conditions for the reduction cell which carry a high current load operated at elevated temperatures. It is recognized that a copper-to-copper disconnect contact surface between the copper anode bar and aluminum bus is electrically superior to a copper-to-aluminum connecting surface. To obviate the need for a substantially more expensive copper bus bar, it is conventional practice to interpose a copper contact strap between the aluminum bus and copper anode bar. According to this procedure, the bus and copper contact surfaces are cleaned as by wire brushing to remove the oxide film and other extraneous matter, and the copper strap is bolted to the bus.

However, a superior metallurgical bond between the copper anode bar and aluminum bus is provided by welding the copper contact member to the bus. As explained above, a direct weld between the aluminum and copper members is not feasible. Therefore, it is customary in a connection of this type to provide an interlayer of filler metal compatible with both the aluminum and copper. A silver interlayer, or alloy thereof, is normally employed for this purpose. The copper member is provided with a silver coating as by brazing, and the coated member is thereafter connected to the aluminum bus by welding, preferably by inert gas shielded tungsten arc welding. This procedure is obviously disadvantageous in that it not only employs an expensive filler metal but further requires the additional brazing operation. Moreover, the welding operation requires a high degree of skill to avoid burning off the silver interlayer and consequently impairing the electrical connection. In this regard, tungsten arc welding is easier to control, but is more expensive and time consuming than other conventional metal arc welding procedures.

An aluminum backing may be flash welded to the copper contact member, and from this composite, the aluminum backing may thereafter be joined to the aluminum bus bar. However, it is desirable, as in an aluminum reduction cell, that the electrical contact be capable of carrying a sufficiently high quantity of current and further dissipate the heat generated at a relatively rapid rate. This is realized by employing a contact of sufficiently large diameter or cross-sectional area. However, flash welded electrical contacts of relatively large diameter would entail a substantial capital investment in that the conventional flash welding machine is not equipped to handle large pieces. Moreover, a machine to handle large pieces requires a greater consumption of electrical power, and further a high percentage of metal is burned off or consumed in the welding operation. That is, for example, joining members of 2 inches diameter would require approximately 4 times the power requirements as members of 1 inch diameter. Further, the time required for flashing would be doubled, and the volume of metal lost with the larger parts is about 8 times that of the smaller parts. In view of these shortcomings and disadvantages, the contact surface area of flash welded aluminum-copper connectors is restricted, and therefore a number of such connectors must be attached to the bus at the zone of contact with each anode bar.

This invention has therefore as one of its primary objects to provide a new and improved copper to aluminum joint and method for making the same.

It is another object of the invention to provide a joint of the above type characterized by high electrical conductivity and high mechanical strength.

It is still another object of the invention to provide in a method for making a joint of the above type which combines a flash welding operation with an upsetting operation.

It is a further object to provide an aluminum-copper electrical contact composite having a relatively large surface contact area, and made by a rapid and convenient method.

It is yet a further object to provide an aluminum-copper composite for electrical connection between an aluminum bus bar and a copper anode bar.

These together with other objects and advantages of the present invention will best be understood by referring to the following detailed specification and preferred embodiments thereof, and the accompanying drawing. In the drawing.

According to the present invention, a copper member and an aluminum member are flash welded to effect a bond between the abutting ends. The resulting composite is thereafter compressed axially to upset the composite thereby resulting in a lateral expansion. Preferably, we employ a relatively ductile aluminum member which will expand upon compression to a greater extent than the copper member and therefore at least partially peripherally encase the latter. The metallurgically bonded and upset composite having a substantially increased copper contact area backed by the aluminum member may then be welded directly to an aluminum bus bar, switch blade or similar electrical conductor, by conventional means. An aluminum filler metal is employed to form a weld fillet between the conductor and the aluminum backing member.

Figure 1:
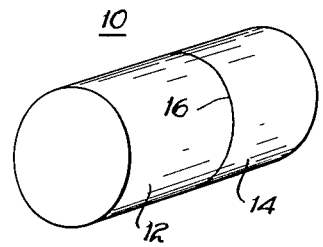
FIGURE 1 is a perspective view of an aluminum-copper composite formed on flash welding.

Referring now more particularly to the drawings, the composite, indicated generally at 10, is formed from an aluminum member 12 and copper member 14, preferably bar or rod shape of substantially circular or square cross-section, and preferably of 99% purity or better. To effect the weld, the members are clamped in the dies of any suitable flash welding machine (not shown) with the ends of the members brought together. A welding current is passed through the parts to bring their ends to a welding temperature, and at the same time pushing the ends together to effect an intimate welding bond between the members, as illustrated in FIGURE 1. It should be understood that the dimensions and particular form of the aluminum and copper members employed may be varied, and is somewhat dependent upon the ductility of the metal parts, and the desired configuration of the final product, as will be more apparent hereafter.

Figure 2:
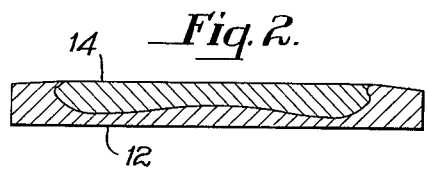
FIGURE 2 is a sectional elevation through a composite such as shown in FIGURE 1 after upsetting.

The resulting aluminum-copper composite 10 is forged, or otherwise compressed axially, in a direction substantially normal to the weld interface 16 to reduce substantially the length of the composite. In forging, a conventional air or steam hammer, hydraulic press, mechanical press, and the like, may be employed. As a result of the forging, the composite expands laterally to effect an increase in cross-section, having the characteristics illustrated in FIGURE 2. It is preferred that the aluminum member employed in the composite be relatively more ductile than the copper part such that upon upsetting, outward expansion of the aluminum member 12 will be greater thereby resulting in at least partial peripheral encasement of the copper part 14, as shown in FIGURE 2. To assure proper encasement of the copper member, it is advantageous to employ members of substantially identical cross-section, and preferably an aluminum part which is greater in length than the copper part. However, appropriate dimensioning, and degree of encasement of the copper part by the aluminum, depends primarily upon such factors as the composition of the metal parts, the relative ductility of the members and the forging technique employed, and the proper conditions may be determined by experimentation by one skilled in the art. In addition, it may be of benefit in obtaining a desired shape to heat the composite to forging temperatures prior to the compressing step. Although it is desirable that the aluminum member be more ductile in relation to the copper member, both members should exhibit sufficient plasticity as not to fracture upon forging.

The upset composite, shown in FIGURE 2, exhibits a substantial increase in exposed surface area, or contact area, of the copper member. As a result, the composite, when employed in an electrical circuit, can carry a greater quantity of current and dissipate heat at a faster rate than a composite that has not been upset. This is particularly advantageous in electrical connections carrying high current loads such as those employed in electrolytic cells for the production of aluminum. While the aluminum-copper weld interface is somewhat brittle, the pressure weld effect obtained on forging thins out or distributes this brittle phase thereby improving the overall joint, which is particularly advantageous when employing the joint under stress conditions.

Figure 3:
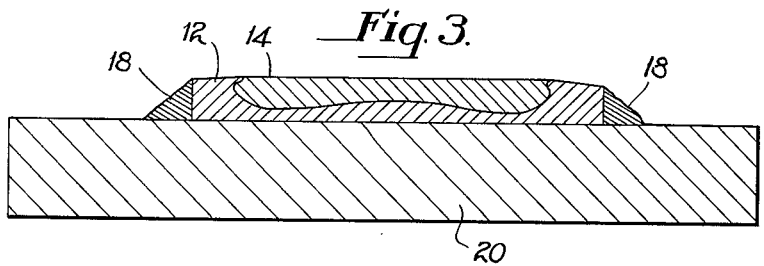
FIGURE 3 is a view similar to that of FIGURE 2 showing the upset composite welded directly to an aluminum bus bar.

Our invention is illustrated by the following example wherein a copper rod one inch in length of 99.9% purity and an aluminum rod 1¼ inches in length of 99% purity, and each with 1¼ inches diameter, were joined at their abutting ends by flash welding. The welded specimen was compressed axially to ⅜ inch thickness by means of a Chambersburg air hammer having 1½ tons capacity. The copper component expanded laterally to 2⅜ inches diameter and was completely backed and surrounded at the periphery by the aluminum component having a diameter of 3 inches. This connector has a copper contact surface of 3.8 times the original surface. The aluminum encasement permits welding of the connector by conventional means to an aluminum bus. Referring to FIGURE 3, an aluminum fillet weld 18 is employed to weld directly the connector to aluminum bus bar 20. A copper anode bar (not shown), for example, may be connected to the copper contact surface of the composite thereby effecting a copper-to-copper disconnect. Where desirable, the flat surface of the aluminum backing member of the composite may be positioned over a hole or opening in the conductor or bus and a fillet weld applied from the reverse side between the conductor and backing member.

In addition to employing the composite as a connector in electrolytic reduction cells, it will be apparent that the composite may be used in numerous electrical devices where a copper-to-copper connection is important. For example, it is possible to use aluminum switch blades to which the composite has been welded.

As used herein and in the appended claims, the words "aluminum" and "copper" include the pure metals, commercial grades of the metals containing the usual impurities, and alloys thereof.

Having described our invention, and certain embodiments thereof, we claim:

1. A method of making a joint between an aluminum and a copper member, said aluminum member being more ductile than said copper member, comprising arranging the members to be joined in end-to-end abutting relation, forming a flash welded joint between the abutting ends of said members, said joint having a brittle phase at the flash weld interface, and applying sufficient pressure to the resultant composite in a direction substantially normal to the flash weld interface to thin out said brittle phase and effect substantial lateral expansion of the said members in directions parallel to the weld interface with upsetting of said aluminum member over said copper member to produce at least partial peripheral encasement of said copper member by said upset aluminum member.

2. In a method of making an electrical connection between an aluminum bus bar and a copper anode bar of an electrolytic reduction cell, arranging a copper contact member and an aluminum backing member in end-to-end abutting relation, said aluminum backing member being more ductile than said copper contact member, forming a flash welded joint between the abutting ends of said members, said joint having a brittle phase at the flash weld interface, and applying sufficient pressure to the resultant composite in a direction substantially normal to the flash weld interface to thin out said brittle phase and effect substantial lateral expansion of the said members in directions parallel to the weld interface with upsetting of said aluminum member over said copper member to produce at least partial peripheral encasement of said copper member by said upset aluminum member, and welding said backing member to said bus bar.

References Cited by the Examiner

UNITED STATES PATENTS

| | | | |
|---|---|---|---|
| 2,624,820 | 1/53 | Payette | 29—155.55 |
| 2,739,369 | 3/56 | Cooney | 29—497.5 X |
| 2,854,074 | 9/58 | Frank et al. | 200—166 |

OTHER REFERENCES

Resistance Welding, first edition, by Wallace A. Stanley, published by McGraw-Hill (Welding Dissimilar Metals, page 156, cols. 1 and 2).

JOHN F. CAMPBELL, *Primary Examiner.*